(12) United States Patent
Alamri

(10) Patent No.: US 9,361,784 B1
(45) Date of Patent: Jun. 7, 2016

(54) EMERGENCY APP

(71) Applicant: Hani Fayiz Alamri, San Bernardino, CA (US)

(72) Inventor: Hani Fayiz Alamri, San Bernardino, CA (US)

(*) Notice: Subject to any disclaimer, the term of this patent is extended or adjusted under 35 U.S.C. 154(b) by 0 days.

(21) Appl. No.: 14/714,347

(22) Filed: May 18, 2015

(51) Int. Cl.
*H04M 11/04* (2006.01)
*G08B 25/01* (2006.01)
*H04W 4/22* (2009.01)
*H04W 4/02* (2009.01)

(52) U.S. Cl.
CPC ............ *G08B 25/016* (2013.01); *H04W 4/02* (2013.01); *H04W 4/22* (2013.01); *H04M 11/04* (2013.01)

(58) Field of Classification Search
CPC ..... H04W 76/007; H04W 4/22; H04W 8/245; H04M 19/04; H04M 11/04
USPC ............... 455/404.1, 404.2, 418, 567; 379/37
See application file for complete search history.

(56) References Cited

U.S. PATENT DOCUMENTS

| | | | | |
|---|---|---|---|---|
| 7,215,946 B1* | 5/2007 | Cardina | ............... | H04L 12/587 379/88.12 |
| 8,666,053 B2* | 3/2014 | Kung | ..................... | H04M 3/54 370/352 |
| 9,171,451 B2* | 10/2015 | Blom | ................. | G06F 19/3493 |
| 2005/0097473 A1* | 5/2005 | Malik | ................... | H04L 12/581 715/739 |
| 2008/0082553 A1* | 4/2008 | Wei | .................... | H04W 52/0235 |
| 2009/0031006 A1* | 1/2009 | Johnson | ............. | H04W 76/021 709/218 |
| 2010/0064307 A1* | 3/2010 | Malhotra | ............ | H04L 65/1086 725/24 |
| 2010/0286997 A1* | 11/2010 | Srinivasan | ............. | G06Q 50/22 705/2 |
| 2011/0244831 A1* | 10/2011 | Azhapilli | .......... | H04W 36/0055 455/412.1 |
| 2012/0240198 A1* | 9/2012 | Shannon | ................. | H04L 63/08 726/4 |
| 2014/0368601 A1* | 12/2014 | deCharms | ............. | H04W 4/021 348/14.02 |
| 2015/0134343 A1* | 5/2015 | Kluger | ................ | G06F 3/04842 705/2 |

* cited by examiner

*Primary Examiner* — Danh Le
(74) *Attorney, Agent, or Firm* — Marina Mikhailova

(57) ABSTRACT

The primary objective of the invention is to provide a computer-implemented method for sending one or more alerts from a mobile alerting system stored in the non-transitory storage medium of an electronic device like mobile phones or smart phones etc. In one embodiment of the invention, the method of sending one or more alerts from a mobile alerting system stored in the non-transitory storage medium comprises of a centralized server and a plurality of mobile devices. Further in the same embodiment of the invention, the processor in the centralized server computes a plurality of instructions stored in the memory of the centralized server. Furthermore, the centralized server receives a primary alert initiation request comprising metadata generated from the primary mobile device, wherein the centralized server extracts the metadata of the alert. The alert is further delivered to a plurality of secondary mobile devices capable of telecommunication.

4 Claims, 1 Drawing Sheet

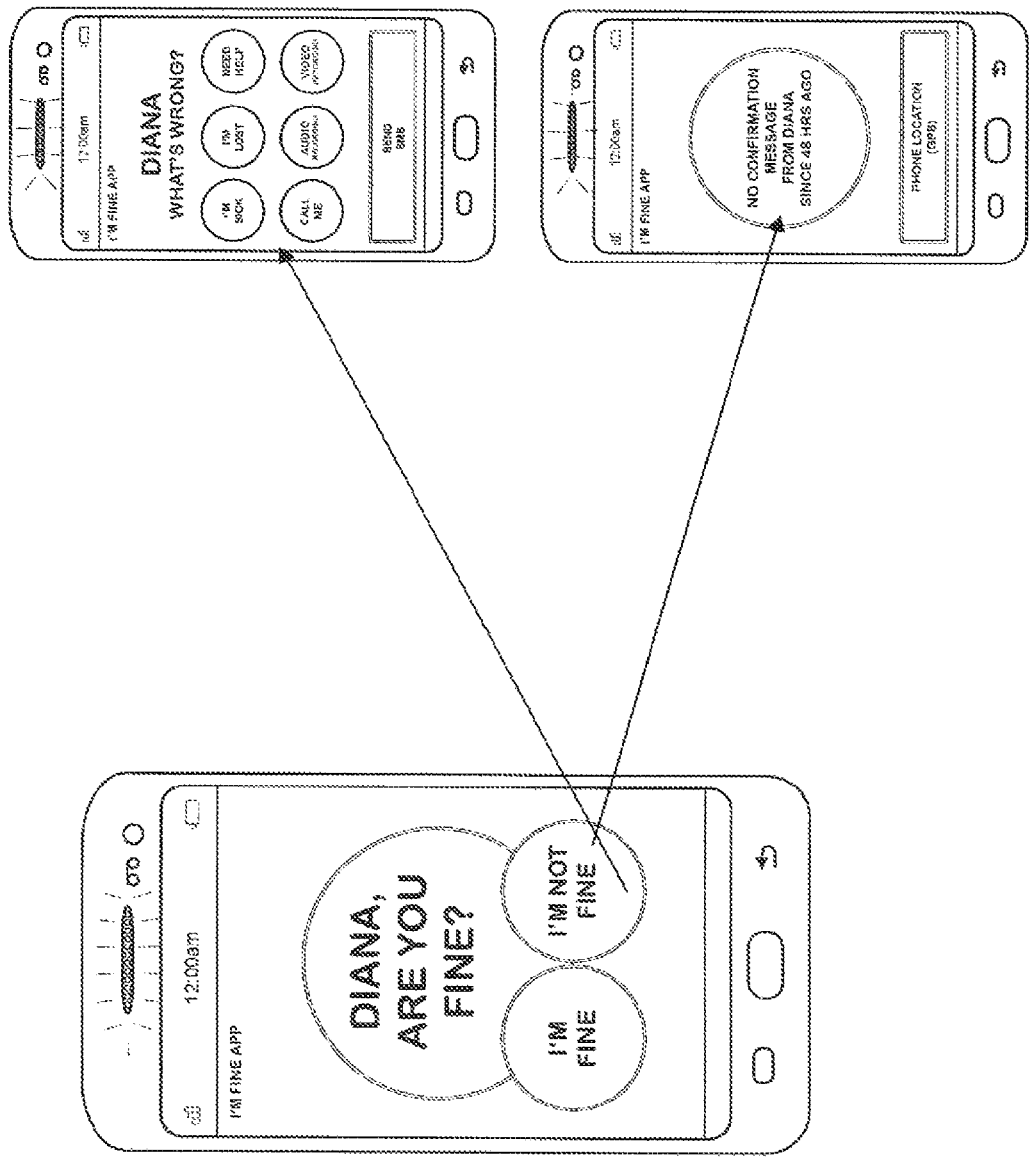

EMERGENCY APP

FIELD OF THE INVENTION

The present invention relates to the field of emergency alert applications system, and in particular, emergency alert applications for mobile computing devices such as smartphones and tablets.

BACKGROUND

When faced with an emergency, it is commonplace to contact emergency services via, for example, dialing 911 from a telephone. However, for 911 or other emergency dispatchers to be most helpful and efficient in assessing an emergent situation and the appropriate response to such an emergency, one must be able to continually communicate accurately with the dispatcher. Additionally, to be able to determine where to send help, a dispatcher must possess knowledge of an accurate geographical location of the person in need at the moment of need. Sometimes, during an emergency, individuals do not have the time or ability to stay connected and clearly convey their circumstances to an emergency responder. Furthermore, in an emergency, individuals often do not have enough time for more than a single call; there is usually not an opportunity to contact family or friends in addition to an emergency responder.

It is often desirable for a person to be able to alert or notify another person, organization, or entity in the event of an emergency. For example, this may be the case for an elderly person living at home. The elderly person may potentially fall, have a medical emergency (e.g., a heart attack), become lost or severely disoriented due to Alzheimer's disease or dementia, or otherwise need emergency help. Often, the elderly people live alone and may not have help readily available. Moreover, emergencies are not limited to just elderly people. Rather, this may also be the case for people with certain medical conditions. A few examples of such medical conditions include, but are not limited to, allergic reactions, heart problems, diabetes, seizures, autism, or other medical and/or mental conditions. Still further, this may also be the case in other emergency situations, such as, for example, serious car accidents, muggings, robberies, attempted kidnappings, and the like. In general, there is a great need in the art for people to be able to alert or notify others in the event of a wide variety of different types of emergencies.

In the past, when individuals utilized mostly home phones, the location of the caller was, for the most part, known (i.e., the phone number from which 911 is contacted can be associated with a fixed physical address). Nowadays, individuals often do not have a home phone, and even if they do and that phone is within reach, they often resort to using their mobile phones to make calls such as a 911 call. When outside the home, of course, users are automatically restricted to utilizing their mobile devices. These mobile devices are difficult to assign an emergency response location to ahead of time (as is generally easily done for stationary home phones), due to the fact that a mobile phone holder may be moving across a wide geographic area at any given time. Compounding this can be a scenario in which the person in need of assistance may rove or be moved from the location initially reported to emergency personnel.

An additional factor to consider can be that an emergency can be subjective and not all emergencies may require the same response. More specifically, for some situations, which an individual would consider an emergency, the person may wish to contact someone other than the authorities police, paramedics, firefighters, etc.) to properly address his or her needs in some circumstances a user's parents, spouse, other family members or friends may be a more suitable emergency contact. In addition, these non-authority contacts may, in some instances, be able to respond more quickly to an emergency and be able to arrive at the location of the emergency more quickly than the authorities may be able to.

BRIEF SUMMARY OF THE INVENTION

The primary objective of the invention is to provide a computer-implemented method for sending one or more alerts from a mobile alerting system stored in the non-transitory storage medium of an electronic device like mobile phones or smart phones etc.

In one embodiment of the invention, the method of sending one or more alerts from a mobile alerting system stored in the non-transitory storage medium comprises of a centralized server and a plurality of mobile devices. Further in the same embodiment of the invention, the processor in the centralized serve pules a plurality of instructions stored in the memory of the centralized server. Furthermore, the centralized server receives a primary alert initiation request generated at a primary mobile device, said primary alert initiation request comprising metadata of an primary alert to be delivered; the centralized server thereafter extras the metadata based on the primary alert initiation request, the extracted metadata including information for delivering the primary alert from the mobile alerting system, delivering a plurality of primary alert message to a plurality of secondary mobile devices capable of telecommunication is sent, which is received at a plurality of secondary mobile device, a notification of response can also be sent back from the secondary mobile device which will be received at the primary device.

Further in yet another embodiment of the invention, auto-generating, at said primary mobile device, a secondary alert initiation request is auto-generated in the primary mobile device in the event wherein no communication is received at the primary mobile device within a specific period of time after said primary alert initiation request is generated.

Additionally in one embodiment of the invention, the mobile alerting system comprises a mobile computing device, wherein the mobile computing device wirelessly communicates with the remote communication system. Also, the system further comprises a dashboard represented in a graphical user interface, wherein the dashboard displays connectivity of the mobile computing device and alert status logs and the extracted metadata include at least one of alert content, alert parameters, recipients list, notification delivery device addresses, list of devices to be targeted and alert delivery scheduling.

The summary is provided to introduce a selection of concepts in a simplified form that are further described below in the detailed description. This summary is not intended to identify key features or essential features of the subject matter, nor is it intended to be used as an aid in determining the scope of the subject matter. In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting. These together with other objects of the invention, along with the various features of novelty which characterize the invention, are pointed out with particularity in the disclosure. For a better understanding of the invention, its operating advantages and the specific objects attained by its uses, reference should be had to the accompanying drawings and descriptive matter in which there are illustrated preferred embodiments of the invention.

BRIEF DESCRIPTION OF THE DRAWINGS

The drawings constitute a part of this specification and include exemplary embodiments to the invention, which may be embodied in various forms. It is to be understood that in some instances various aspects of the invention may be shown exaggerated or enlarged to facilitate an understanding of the invention.

FIG. 1 illustrates the various functionality of the method.

DETAILED DESCRIPTIONS OF THE INVENTION

The following detailed description contains specific details that are set forth to provide a comprehensive understanding of the present invention. Although the following detailed description contains many specifics for the purposes of illustration, anyone of ordinary skill in the art will appreciate that many variations and alterations to the following details are within the scope of the invention.

The present invention can be implemented on any communication device that has hardware components that can perform telecommunication such as (but not limited to)—computers (desktop, laptop, tablets), smart phones, personal multimedia devices, etc.

The various devices on which the applications that implement the present invention run may use one or more processors with different instruction-sets, architectures, clock-speeds, etc. and memory that may include high speed random access memory and may include non-volatile memory such as one or more magnetic disk storage devices, flash memory devices and other kinds of solid state memory devices.

The various applications that can implement the present invention run on electronic devices that may use at least one physical user interface device that provide the means of control and navigation within the operating system and applications that run on the devices include (but not limited to) touch-pads such as those described in (but not limited to)— (1) U.S. patent application Ser. No. 10/722,948 ("Touch pad for handheld device", filed Nov. 25, 2003); (2) U.S. patent application Ser. No. 10/188,182 ("Touch, pad for handheld device", filed Mar. 21, 2006); (3) U.S. patent application Ser. No. 08/210,610 ("Computer system with touchpad support in operating system", filed Mar. 18, 1994); (4) U.S. patent application Ser. No. 643,256 ("Movable touch pad with added functionality", filed Ser. No. 10/643,256), touch screens such as those described in (but not limited to) (1) U.S. patent application Ser. No. 11/381,313, "Multipoint Touch Surface Controller," filed on May 2, 2006; (2) U.S. patent application Ser. No. 10/840,862, "Multipoint Touchscreen," filed on May 6, 2004; (3) U.S. patent application Ser. No. 10/903,954, "Gestures For Touch Sensitive Input Devices," filed on Jul. 30, 2004; (4) U.S. patent application Ser. No. 11/048,264, "Gestures For Touch Sensitive Input Devices," filed on Jan. 31, 2005; (5) U.S. patent application Ser. No. 11/038,590, "Mode-Based Graphical User Interfaces For Touch Sensitive Input Devices," filed on Jan. 18, 2005; (6) U.S. patent application Ser. No. 11/228,758, "Virtual Input Device Placement On A Touch Screen User Interface," filed on Sep. 16, 2005; (7) U.S. patent application Ser. No. 11/228,700, "Operation Of A Computer With A Touch Screen interface," filed on Sep. 16, 2005; (8) U.S. patent application Ser. No. 11/228,737, "Activating Virtual Keys Of A Touch-Screen Virtual Keyboard," filed on Sep. 16, 2005 and (9) U.S. patent application Ser. No. 11/367,749, "Multi-Functional Hand-Held Device," filed on Mar. 3, 2006, click wheel such as those described in U.S. patent application Ser. No. 11/549,619 "Method, device, and graphical user interface for dialing with a click wheel" filed on Oct. 13, 2006, keyboards such as those mentioned in (but not limited to) U.S. patent application Ser. No. 07/711,760 ("Ergonomic keyboard input device", filed on Jun. 6, 1991), mouse such as those described in (but not limited to) (1) application Ser. No. 09/167,314 ("Computer mouse with enhance control button (s)", filed on Oct. 6, 1998); (2) application Ser. No. 08/288,945 ("Roller mouse for implementing scrolling in windows applications", filed on Aug. 10, 1994) and gesture recognition means such as those described in (but not limited to) (1) European Patent application publication number: EP2482176 A2 ("Multi-input gesture control for a display screen", filed on Nov. 4, 2011) and (2) patent application with publication number 20120317511 A1 ("DISPLAY WITH BUILT IN 3D SENSING CAPABILITY AND GESTURE CONTROL OF TV", filed on Aug. 21, 2012).

Display means used by these devices may use LCD (liquid crystal display) technology, LED (light Emitting Diode) technology, CRT (Cathode ray tube) technology, or LPD (light emitting polymer) technology or any other display technologies. Various realizations of graphics display circuitry that implement a Graphics Processing Unit (GPU) are used to achieve video interface between user and these electronic devices.

Connectivity of these devices with networks such as the internet, an intranet and/or wireless network such as cellular telephone network, a wired or wireless local area network (LAN) and/or metropolitan area network (MAN) and/or WAN (wide area network) and other wireless communication is achieved by use of a plurality of communication standards, protocols and technologies like Global System for mobile communication (GSM), Enhanced Data GSM Environment (EDGE), wideband code division, of multiple access (W-CDMA), DLNA, LTE (Long Term Evolution), code division of multiple access (CDMA), time division multiple access (TDMA), Bluetooth, Wireless Fidelity (Wi-Fi) and/or any other suitable communication protocol, including communication protocols not yet developed as of the filing date of this document.

The present invention maybe be implemented on applications that run on a single or variety of operating system platforms including but not limited to OS X, WINDOWS, UNIX, IOS, ANDROID, SYMBIAN, LINUX, or embedded operating systems such as VxWorks.

The present invention may also be implemented to work with various web browsers including but not limited to Internet Explorer, Mozilla Firefox, Safari and Opera that access and handle various types of web pages constructed with various mark-up languages such as HTML, HTML-5, XHTML, XML, etc. and the associated CSS (cascading style sheet) files and java-script files.

The method implements a Graphical User Interface operable with the means for control and navigation of the user's communication device that enables the user to use the various means provided through the system.

The invention primarily provides a computer-implemented method for sending one or more alerts from a mobile alerting system stored in the non-transitory storage medium of an electronic device like mobile phones or smart phones etc Further, the method of sending one or more alerts from a mobile alerting system stored in the non-transitory storage medium comprises of a centralized server and a plurality of mobile devices. Further in the same embodiment of the invention, the processor in the centralized server computes a plurality of instructions stored in the memory of the centralized server. Furthermore, the centralized server receives a primary alert initiation request generated at a primary mobile device, the primary alert initiation request comprising metadata of an primary alert to be delivered; the centralized server thereafter extracts the metadata based on the primary alert initiation request, the extracted metadata including information for delivering the primary alert from the mobile alerting system; a plurality of primary alert message to a plurality of secondary mobile devices capable of telecommunication is sent, which is received at a plurality of secondary mobile device, a notification of response can also be sent back from the secondary mobile device which will be received at the primary device.

Further in yet another embodiment of the invention, auto-generating, at the primary mobile device, a secondary alert initiation request is auto-generated in the primary mobile device in the event wherein no communication is received at the primary mobile device within a specific period of time after the primary alert initiation request is generated.

Additionally in one embodiment of the invention, the mobile alerting system comprises a mobile computing device, wherein the mobile computing device wirelessly communicates with the remote communication system. Also, the system further comprises a dashboard represented in a graphical user interface, wherein the dashboard displays connectivity of the mobile computing device and alert status logs and the extracted metadata include at least one of alert content, alert parameters, recipients, list, notification delivery device addresses, list of devices to be targeted and alert delivery scheduling.

I claim:

1. A computer-implemented method for sending one or more alerts from a mobile alerting system stored in a non-transitory storage medium of a plurality of mobile devices, said method comprising:

computing with the processor of a centralized server a plurality of instructions in the memory of said centralized server for:

receiving, at said centralized server, an primary alert initiation request generated at a primary mobile device, said primary alert initiation request comprising metadata of an primary alert to be delivered;

extracting, at said centralized server, said metadata based on said primary alert initiation request, said extracted metadata including information for delivering said primary alert from said mobile alerting system;

delivering, from said centralized server, a plurality of primary alert message to a plurality of secondary mobile devices capable of telecommunication;

receiving, at a plurality of secondary mobile device said primary alert message generated by the primary mobile device;

receiving, at the primary mobile device, a communication initiated by said secondary mobile devices, auto-generating, at said primary mobile device, a secondary alert initiation request in an event wherein no communication is received at the primary mobile device within a specific period of time after said primary alert initiation request is generated;

collecting tracking data and alert responses associated with the alert delivered within the remote communication system;

updating the metadata stored persistently in the first storage place based on the tracking date and alert responses.

2. The method of claim 1, wherein the mobile alerting system comprises a mobile computing device, wherein the mobile computing device wirelessly communicates with the remote communication system.

3. The method of claim 1, wherein the extracted metadata include at least one of alert content, alert parameters, recipients list, notification delivery device addresses, list of devices to be targeted and alert delivery scheduling.

4. The method of claim 1, wherein the mobile alerting system further comprises a dashboard represented in a graphical user interface, wherein the dashboard displays connectivity of the mobile computing device and alert status logs.

* * * * *